United States Patent [19]

Dust et al.

[11] Patent Number: 4,876,356
[45] Date of Patent: Oct. 24, 1989

[54] NAPHTHOLACTAM DYES AND OPTICAL RECORDING MEDIUM CONTAINING THESE DAYS

[75] Inventors: Matthias Dust, Mannheim; Peter Neumann, Wiesloch; Ernst Schefczik, Ludwigshafen; Heidi Benthack-Thoms, Limburgerhof; Helmut Barzynski, Bad Durkheim; Klaus-Dieter Schomann, Ludwigshafen; Harald Kuppelmaier, Heidelberg; Eberhard Koester, Frankenthal, all of Fed. Rep. of Germany

[73] Assignee: BASF Aktiengesellschaft, Ludwigshafen, Fed. Rep. of Germany

[21] Appl. No.: 24,988

[22] Filed: Mar. 12, 1987

[30] Foreign Application Priority Data

Mar. 12, 1986 [DE] Fed. Rep. of Germany ....... 3608214

[51] Int. Cl.$^4$ .................. C07D 209/90; C07D 409/04
[52] U.S. Cl. .................................... 548/419; 430/270; 548/424; 548/436
[58] Field of Search .................. 548/419, 424, 436

[56] References Cited

U.S. PATENT DOCUMENTS

| | | |
|---|---|---|
| 3,399,191 | 8/1968 | Brack .............................. 548/436 X |
| 3,687,972 | 8/1972 | Padmanathan ..................... 548/436 |
| 3,963,747 | 6/1976 | Schefczik et al. .............. 548/419 X |
| 4,023,185 | 5/1977 | Bloom et al. .................... 346/135 |
| 4,241,355 | 12/1980 | Bloom et al. ................... 346/135.1 |
| 4,242,689 | 12/1980 | Bloom et al. ................... 346/135.1 |
| 4,380,769 | 4/1983 | Thomas et al. .................. 346/135.1 |
| 4,458,004 | 7/1984 | Tanikawa ............................ 430/270 |
| 4,460,665 | 7/1984 | Kunikane et al. ................. 428/199 |
| 4,598,151 | 7/1986 | Kuhlthau et al. ............... 548/436 X |

FOREIGN PATENT DOCUMENTS

| | | |
|---|---|---|
| 0084729 | 8/1983 | European Pat. Off. . |
| 1170569 | 5/1964 | Fed. Rep. of Germany ...... 548/436 |
| 3014677 | 12/1980 | Fed. Rep. of Germany . |
| 3007296 | 9/1981 | Fed. Rep. of Germany . |
| 132231 | 8/1983 | Japan . |
| 2055218 | 2/1981 | United Kingdom . |

OTHER PUBLICATIONS

Ullmann, Encylkopadie Der Technischen Chemie, vol. 7, p. 216, and vol. 11, pp. 435-436 (1976).
J. Org. Chemi. USSR 18, 380-386, (1982); Mikhailenko et al.
Chem. Heterocycl. Comp. 9, 314-315, (1973); Shteinberg.
SU-A-613-692, (Abstract only supplied and considered), 1979.
J. Vac. Sci. Techol. 18(1), Jan./Feb. 1981, pp. 100 to 104, Smith.

Primary Examiner—Joseph Paul Brust
Attorney, Agent, or Firm—Oblon, Spivak, McClelland, Maier & Neustadt

[57] ABSTRACT

Naphtholactam dyes of the formula

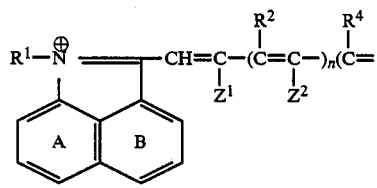

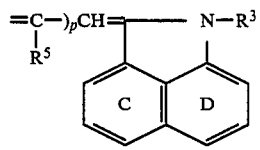

where $R^1$, $R^2$, $R^3$, $R^4$, $R^5$, n, p, $Z^1$, $Z^2$ and the rings A, B, C and D each have the meanings stated in the description, and an optical recording medium which contains one or more naphtholactam dyes and may contain a base.

3 Claims, No Drawings

NAPHTHOLACTAM DYES AND OPTICAL RECORDING MEDIUM CONTAINING THESE DAYS

The present invention relates to novel naphtholactam dyes and an optical recoding medium containing one or more naphtholactam dyes a base.

Recording materials which experience a localized change of state when exposed to radiation of high energy density, eg. laser light, are known. This thermally initiated change of state, for example varporization, change in flow behavior of fading, is associated with a change in the optical properties, for example the absorption as a result of a change in the absorption maximum or the extinction, which can be utilized for information or data recording.

Because of the small size of the component, its low energy requirement and the possibility of direct modulation of the optical output power by modulation of the electric driving current, solid-state injection lasers which emit in the near infrared range, especially the AlGaAs laser which operates in the wavelength range from about 750 to 950 nm, are particularly useful as a light source for an optical recording system.

For this application, a large number of inorganic and organic materials are known which have an adequate absorption in the relevant wavelength range and which change their optical properties by separation, vaporization, melting or in some other way, as a result of absorption of the radiation and hence of the energy present therein in the stated wavelength range.

The known information recording materials consist of a base on which thin layers of inorganic materials, for example metals, semimetals, alloys or chalcogen glass or organic compounds, eg. IR dyes, are applied. The thin layers are produced in particular by vapor deposition under reduced pressure or by atomization techniques. The thickness of the layers should be chosen so that the total incident radiation is absorbed, unless interference phenomena are to be utilized. The base may consist of glass or of a suitable plastic, for example a polycarbonate, polymethyl methacrylate, polystyrene, polystyrene copolymers, polyvinyl chloride or polymethylpentene.

For use as a storage medium, it is essential that the amorphous layers do not change over prolonged periods.

Aging processes, for example crystallization or fading under the action of light and heat, which change the morphology of the storage layer, occur relatively frequently in thin layers deposited by vapor deposition. Neutral IR dyes in polymer films, ionic IR dyes in the form of a lake or IR chromophores chemically bonded to polymers should be stable for prolonged periods. Furthermore, the latter have the advantage that they can be prepared by a more economical process.

A wide range of bases, reflector materials and laser-sensitive layers for optical recording media for operation with semiconductor injection lasers are known. In particular, phthalocyanine compound, methine dyes and quadratic acid derivatives have been described as organic IR dyes.

US-A-4 242 689 discloses a recording medium which contains diinednoperylene as a light-absorbing layer. This medium can be written on using an argon laser.

US-A-4 023 185 describes recording media in which the light-absorbing layer is produced by vaporization of the dyes C.I. Solvent Black 3 and C.I. No. 26,150. These recording media can be written on using an argon laser.

US-A-4 380 769 discloses further recording media which can be written on using an argon laser and which contain, in the light-absorbing layer or as this layer, azo dyes and/or cumarin compounds in a polymer binder.

DE-A-3 007 296 discusses a system for data recording which contains an indigoid photochromic dye bonded to a polymer and having an absorption maximum at 545 nm.

Other known optical storage systems are those which contain, as absorbing compounds, oxazines (JP-A-132 231/1983), cyanine dyes (JP-A-112 790/1983 and 125 246/1983) and phthalocyanine compounds (EP-A-84 729, US-A-4 241 355 and JP-A-56 892/1983). These stores can be written on using an He-Ne laser (633 nm).

Finally, De-A-3 014 677 describes an optical recording medium which contains, as the dye, 1,4-diamino-2-methoxyanthraquinone dissolved in a polymer matrix.

Materials which are to be used as the light-absorbing layer of the recording medium must be capable of being applied, on suitable bases, in the form of a thin, smooth layer of high optical quality and predetermined thickness. The materials must furthermore absorb at the wavelength of the light source used and must be sufficiently sensitive, ie. must change their optical properties in the irradiated region in one of the ways described above when exposed to light pulses which have an energy content of a few nJ or less and have a focal diameter of about 1 μm or less.

It is an object of the present invention to provide novel naphtholactam dyes and optical recording media which contain naphtholactam dyes as light-absorbing layers, meet the above requirements and furthermore are easy to prepare, stable over a long period, noncorroding and nontoxic. These recording media should also be capable of being written on and read by means of semiconductor lasers.

We have found that this object is achieved, and that very good optical recording media, which are suitable for writing on and reading by means of a semiconductor laser and consist of a base and a laser-sensitive dye-containing layer of a polymer, are obtained if the polymer contains one or more dyes of the formula Ib

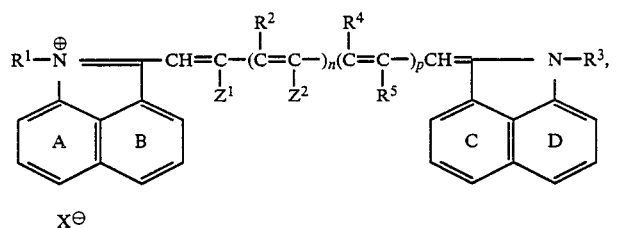

(Ib)

where
R[1] and R[3] are identical or different and independently of one another are each $C_1$–$C_{20}$-alkyl which is unsubstituted or substituted and/or may be interrupted by oxygen, unsubstituted or substituted $C_5$–$C_7$-cycloalkyl or unsubstituted or substituted phenyl, R[2], R[4] and R[5] are identical or different and independently of one another are each hydrogen, unsubstituted or substituted $C_1$–$C_6$-alkyl, unsubstituted or substituted $C_5$- or $C_6$-cycloalkyl, unsubstituted or substituted phenyl, $C_1$–$C_6$-alkoxycarbonyl, $C_1$–$C_6$-carboxyalkyl, hydroxyl, $C_1$–$C_4$-alkoxy or halogen, n is 0 or 1, p, independently of n, is 0, 1 or 2, $Z^1$ and $Z^2$ are each hydrogen or, where n is 1, together form an unsubstituted $C_1$–$C_4$-alkyl-substituted $C_2$- or $C_3$-alkylene chain or one or two carbonyl groups, and $X^\ominus$ is an anion, and the rings A, B, C and D are substituted or substituted or benzofused.

Naphtholactam dyes of the formula Ia

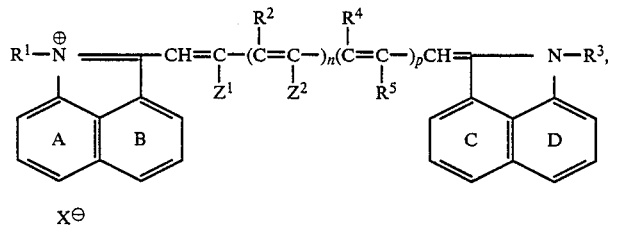

(Ia)

where $R^1$, $R^2$, $R^3$, $R^4$, $R^5$, n, p, $Z^1$, $Z^2$ and $X^\ominus$ have the above meanings, with the proviso that if (a) the rings A, B, C and/or D are unsubstituted or substituted by halogen, $C_1$–$C_4$-alkoxy, $C_1$–$C_4$-mono- or dialkylamino or nitro, n and p are not simultaneously 0, (b) the rings A, B, C and/or D are unsubstituted or substituted by halogen, $C_1$–$C_4$-alkoxy, $C_1$–$C_4$-mono- or dialkylamino or nitro and n is 1, p is 0 and $Z^1$ and $Z^2$ are each hydrogen, $R^2$ is not hydrogen, (c) the rings A, B, C and/or D are unsubstituted or substituted by halogen, $C_1$–$C_4$-alkoxy, $C_1$–$C_4$-mono- or dialkylamio or nitro and n is 0 and p is 1 or 2, $R^4$ and $R^5$ are not simultaneously hydrogen, and (d) the rings A, B, C and/or D are unsubstituted or substituted by halogen, $C_1$–$C_4$-alkoxy, $C_1$–$C_4$-mono- or dialkylamino or nitro, n and p are each 1 and $Z^1$ and $Z^2$ are each hydrogen, one or more of the radicals $R^2$, $R^4$ and $R^5$ is not hydrogen, are novel.

All of the alkyl groups which occur in the above-mentioned radicals may be either straight-chain or branched.

In formulae Ia ad Ib, R[1] and R[3] are each, for example, $C_1$–$C_{20}$-alkyl which is unsubstituted or substituted by phenyl, halogen, $C_1$–$C_4$-alkanoyl, carboxyl, $C_1$–$C_4$-alkanoylamino, $C_1$–$C_4$-alkoxycarbonyl, $C_1$–$C_4$-alkoxycarbonylamino or $C_1$–$C_4$-alkylanilino and/or may be interrupted by oxygen, such as methyl, ethyl, propyl, isopropyl, butyl, isobutyl, tert-butyl, pentyl, 2-methylbutyl, hexyl, 2-methylpentyl, heptyl, octyl, 2-ethylhexyl, isooctyl, nonyl, isononyl, decyl, isodecyl, dodecyl, 3,5,5,7-tetramethylnonyl, isotridecyl, pentadecyl, hexadecyl, heptadecyl, octadecyl, nonadecyl, eicosyl (the names isooctyl, isononyl, isodecyl and isotridecyl are trivial names and are derived from the alcohols obtained by the oxo synthesis; cf. Ullmann, Enzyklopädie der Technischen Chemie, 4th edition, volume 7, pages 216 and 217, and volume 11, pages 435 and 436), benzyl, 2-phenylethyl, trifluoromethyl, trichloromethyl, 1,1,1-trifluoroethyl, heptafluoropropyl, 2-methoxyethyl, 2-ethoxypropyl, 3-ethoxypropyl, 3,6-dioxaheptyl, 3,6-dioxaoctyl, 3,6,9-trioxadecyl, propan-2-on-1-yl, butan-3-on-1-yl, 2-ethylpentan-3-on-1-yl, carboxymethyl, 2-carboxyethyl, 3-carboxypropyl, 4-carboxybutyl, 5-carboxypentyl, 4-carboxy-3-oxabutyl, acetylaminomethyl, 2-(acetylamino)ethyl, 2-(butyrylamino)ethyl, ethoxycarbonylmethyl, 2-(ethoxycarbonyl)ethyl, 3-(methoxycarbonyl)propyl, ethoxycarbonylaminomethyl, 2-(ethoxycarbonylamino)ethyl, B 4-methylanilinomethyl, 2-(4-isopropylanilino)ethyl, $C_5$–$C_7$-cycloalkyl which is unsubstituted or substituted by $C_1$–$C_4$-alkyl or halogen, such as cyclopentyl, cyclohexyl, cycloheptyl, 3-methylcyclopentyl, 4-ethylcyclohexyl or 2,3-dichlorocyclohexyl, and phenyl which is unsubstituted or substituted by $C_1$–$C_4$-alkyl, $C_1$–$C_4$-alkoxy, halogen or $C_1$–$C_4$-dialkylamino, such as phenyl, 4-methylphenyl, 4-isopropylphenyl, 4-methoxyphenyl, 2,4-dimethoxyphenyl, 2-chlorophenyl, 4-bromophenyl or 4-dimethylaminophenyl.

In formulae Ia and Ib, $R^2$, $R^4$ and $R^5$ are each, for example, hydrogen, unsubstituted or substituted $C_1$–$C_6$-alkyl (for example, the corresponding unsubstituted and substituted radicals stated under R[1] and R[3]), unsubstituted or substituted $C_5$- or $C_6$-cycloalkyl (for example, the corresponding unsubstituted and substituted radicals stated under R[1] and R[3]), unsubstituted or substituted phenyl (for example, the corresponding unsubstituted and substituted radicals stated under R[1] and R[3]), $C_1$–$C_6$-alkoxycarbonyl, such as methoxycarbonyl, ethoxycarbonyl, propoxycarbonyl, isobutoxycarbonyl, pentyloxycarbonyl or hexyloxycarbonyl, $C_1$–$C_6$-carboxyalkyl, such as carboxymethyl, 2-carboxyethyl, 2-carboxypropyl or 3-carboxypropyl, hydroxyl, $C_1$–$C_4$-alkoxy, such as methoxy, ethoxy, propoxy, isopropoxy or butoxy, or halogen, such as fluorine, chlorine or bromine.

In formulae Ia and Ib, $Z^1$ and $Z^2$ are each, for example, hydrogen or, where n is 1, may together form an unsubstituted or $C_1$–$C_4$-alkyl-substituted $C_2$- or $C_3$-alkylene chain such as 1,2-ethylene, 1,2-propylene or 1,3-propylene; or one or two carbonyl groups.

In formulae Ia and Ib, XHU $\ominus$ is an inorganic or organic anion, for example a halide, such as chloride, bromide or iodide, or a sulfate, perchlorate, tetrafluoborate, methylsulfonate, phenylsulfonate, 4-methylphenylsulfonate or salicylate. Formulae Ia and Ib are also intended to embrace naphtholactam dyes which have a betaine structure, ie. those in which the anionic group forms part of the dye molecule.

In formulae Ia and Ib, the rings A, B, C and D may be unsubstituted or substituted by, for example, $C_1$–$C_4$-alkyl, phenyl, $C_1$–$C_4$-alkoxy, $C_1$–$C_{20}$-alkylthio, halogen, nitro, cyano, $C_1$–$C_4$-mono- or dialkylamino, $C_1$–$C_4$-alkylsulfonyl, $C_1$–$C_4$-alkoxysulfonyl, phenylsulfonyl, $C_1$–$C_4$-alkylphenylsulfonyl, hydroxysulfonyl, anilino, $C_1$–$C_4$-alkylanilino, $C_1$–$C_4$-alkanoyl, $C_1$–$C_4$-alkanoylamino, $C_1$–$C_4$-alkoxycarbonyl, $C_1$–$C_4$-alkoxycarbonylamino, carbamyl, $C_1$–$C_4$-N-mono- or N,N-dialkylcarbamyl, sulfamyl, $C_1$–$C_4$-N-mono- or N,N-dialkylsulfamyl, ureido, $C_1$–$C_4$-alkyl-substituted ureido, phenoxy, phenyl-thio or the radical

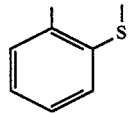

or benzofused.

Examples of substitution patterns in the naphtholactam system are the following:

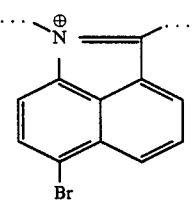

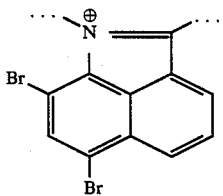

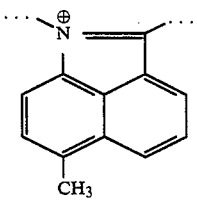

-continued

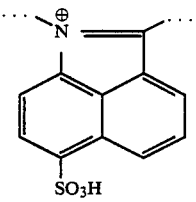

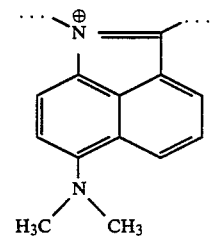

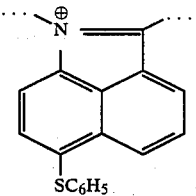

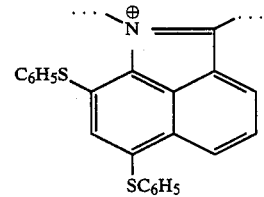

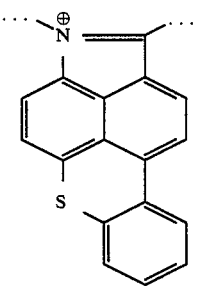

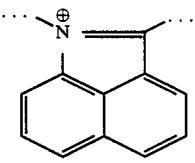

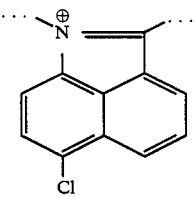

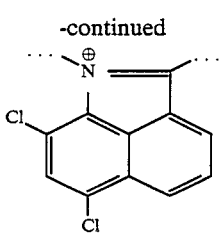

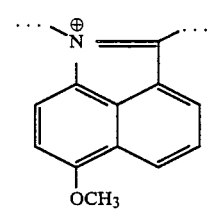

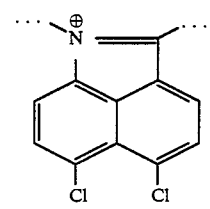

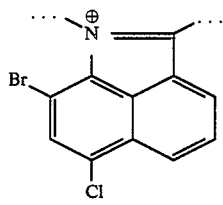

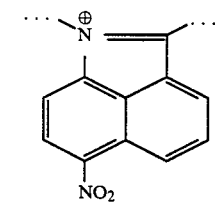

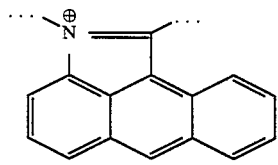

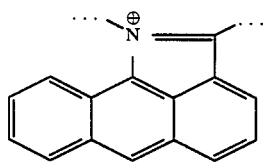

Preferred naphtholactam dyes are those of the formula Ia, where $R^1$ and $R^3$ are each $C_1-C_{12}$-alkyl, in particular $C_1-C_4$-alkyl, which may be interrupted by oxygen, or are each benzyl, 2-phenylethyl, $C_5$- or $C_6$-cycloalkyl or phenyl, $R^2$, $R^4$ and $R^5$ are each hydrogen, $C_1-C_4$-alkyl, in particular $C_1$- or $C_2$-alkyl, $C_5$- or $C_6$-cycloalkyl, phenyl, $C_1-C_4$-alkoxycarbonyl, $C_1$ or $C_2$-carboxyalkyl, chlorine or bromine, n is 1 and p is 0 or 1, and the rings A, B, C and D are unsubstituted or substituted by methyl, ethyl, phenyl, $C_1-C_4$-alkoxy, $C_1-C_4$-alkylthio, cyano, $C_1$- or $C_2$-dialkylamino, chlorine, bromine, hydroxysulfonyl, phenylthio or the radical

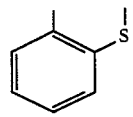

Other preferred naphtholactam dyes are those of the formula Ia, where n is 1, p is 0 or 1 and $Z^1$ and $Z^2$ are each hydrogen or together form a 1,2-ethylene or 1,3-propylene chain.

Preferred anions $X^\ominus$ are chloride bromide, iodide, perchlorate, tetrafluoborate and 4-methylphenylsulfonate.

The novel dyes are prepared by condensing a cycloammonium compound of the formula II

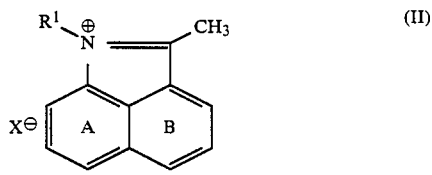

where $R^1$, A, B and $X^\ominus$ have the above meanings, with C-1, C-3 or C-5 building blocks in an acidic or alkaline medium, in the presence of an inert solvent at from 20° to 150° C. Examples of suitable C-1, C-3 and C-5 building blocks are:

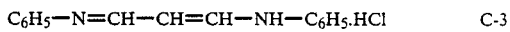

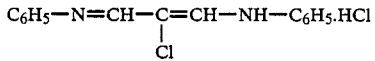

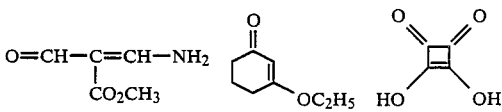

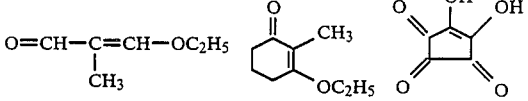

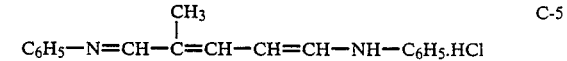

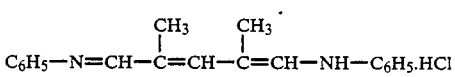

The cycloammonium compounds of the formula II which are required as starting materials, and the C-1, C-3 and C-5 building blocks, are known or may be prepared by a conventional method.

Examples of suitable inert solvents for the reactions are methanol, ethanol, butanol, toluene, xylene, chlorobenzene, tetrahydrofuran, dioxane, glacial acetic acid, acetic anhydride and compatible mixtures of these.

In the reaction of the cycloammonium compounds of the formula II with malonodialdehydebisanil hydrochloride or diphenylformamidine, 1:1 reaction products of the formula III

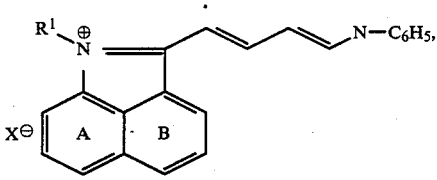

where $R^1$, A, B and $X^\ominus$ have the above meanings, can be obtained if suitable reaction conditions are chosen. The said reaction products can be reacted with further cycloammonium compounds of the formula IV

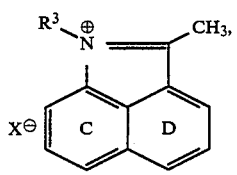

where $R^{3L}$, D, C and $X^\ominus$ have the above meanings, to give symmetric or asymmetric naphtholactam dyes:

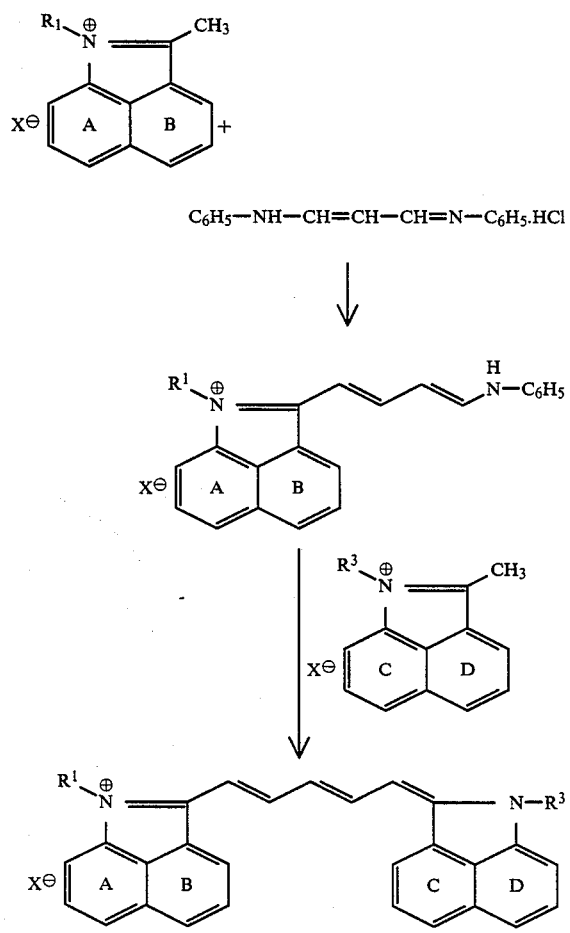

Some symmetric naphtholactam dyes are already known and are described in J. Org. Chem. USSR 18 (1982), 380–386 and in Chem. Heterocyl. Comp. 9 (1973), 314–315. SU-A-613 692 discloses laser dyes based on naphtholactam.

The naphtholactam dyes of the formula Ia have a very high molar absorption in the range from 700 to 1200 nm. They are readily soluble in organic solvents and/or thermoplastics or crosslinked plastics.

The novel recording system has a very high absorption at the wavelength of the semiconductor laser of about 750–950 nm. The polymer layers can be applied on a light-reflecting layer in such a way that smooth absorption layers of high optical quality are obtained which have an advantageous threshold energy and in which the information to be stored can be written with high signal-to-noise ratio.

The recording medium according to the present invention can be written on and read by means of a semiconductor laser. It is also very stable to atmospheric influences and daylight.

Because of the good light absorption of the dyes, the novel recording medium is very sensitive to the light of the GaALAs semiconductor laser.

The structure of recording media is known per se [J. Vac. Sci. Technol. 18 (1) Jan./Feb. (1981), 105].

A reflecting layer may be present between the light-absorbing layer and the base, so that that part of the incident light which is not absorbed and passes through the colored layer is reflected at the reflector layer and passes once again through the colored layer.

Exposure may also be effected through a transparent substrate. A suitable sequence of layers in this case is: substrate/absorber layer/any reflector layer present.

The light-reflecting layer must be such that it reflects as quantitatively as possible the light used for recording and for scanning. Examples of suitable light-reflecting materials are aluminum, rhodium, gold, tin, lead, bismuth, copper and dielectric mirror. The thickness of the light-reflecting layer should be such that the light used for recording or for scanning is reflected as completely as possible by this layer.

Mirrors having low thermal conductivity are advantageous for this purpose. The base, or the light-reflecting layer, must have an optically smooth, flat surface, which should be such that the absorbing layer adheres firmly to it. In order favorably to influence the surface quality and adhesion phenomena, the base and/or the reflector may be provided with the subbing layer consisting of a thermosetting plastic or thermoplastic material.

Metallic reflecting layers are preferably applied in a conventional manner by vapor deposition under reduced pressure or by applying suitable metal foils to the base. The novel laser-sensitive layer is preferably applied by whirler-coating dissolved or dispersed dye in the presence of a binder. Knife-coating and immersion are also suitable methods for producing the layers.

To apply the absorption layers from solution, a solution or, if appropriate, a dispersion of the dye or dye mixture and of the polymer in a suitable solvent such as methylene chloride, chloroform, carbon tetrachloride, acetone, methyl ethyl ketone, cyclohexanone, toluene, acetonitrile, ethyl acetate, methanol or a mixture of these solvents, is prepared, and, if necessary, a binder is added.

Suitable binders are either radiation-curable or heat-curable resins, for example photopolymers, silicone resins and epoxy resins, or thermoplastics.

Preferred thermoplastics are those which have very little if any crystallinity and glass transition temperatures >35° C., in particular >75° C. Moreover, the binders, such as resin or thermoplastics, must be readily compatible with the naphtholactam dyes of the formula Ib. Examples of suitable binders are water-insoluble binders having a high dissolving power for the naphtholactam dyes, such as (meth)acrylate polymers or copolymers, polystyrene homopolymers or copolymers, polyvinyl carbazole, polyvinyl ester copolymers, polyvinyl chloride and cellulose esters.

The dye formulation is then applied by knife coating or immersion, but preferably by whirler-coating, onto a subbing layer which has been cleaned or pretreated beforehand, and the layer is dried or cured in the air. The film may also be dried or cured under reduced pressure, at elevated temperatures or, if necessary, using radiation.

Depending on the structure of the system, the dye-in-polymer layer is applied first, followed by the reflector, or vice versa. If desired, the application of intermediate and protective layers or of a reflecting layer can be dispensed with.

If the dye-in-polymer layer does not possess sufficient mechanical stability, it can be covered with a transparent protective layer. This can be done using a number of polymers which are capable of forming a protective layer when applied by whirler-coating, knife-coating or immersion using dissolved polymers, or by vapor deposition, in particular of fluorinated polymers, under reduced pressure.

If the system (data store) is composed of two identical or different recording media in the form of a sandwich, a protective layer can be dispensed with. In addition to greater mechanical and rotational stability, the sandwich structure has the advantage that it has twice the storage capacity.

Where the optical recording medium is of sufficient quality, the protective and/or intermediate layers can be dispensed with. If these layers cannot be dispensed with, their thickness must be chosen, taking into account the refractive index of the material and laser wavelength used, so that no troublesome interference can occur.

The heat generated during absorption of the laser light causes the thermoplastic to flow outward in a radial direction and hence produces holes with crisp edges, so that an excellent signal/noise ratio is achieved.

The Examples which follow illustrate the invention.

A. Preparation of the dyes

EXAMPLE 1

A mixture of 3.2 g (10 millimoles) of 1-ethyl-2-methylbenzo[c,d]indolium iodide, 0.46 g (4 millimoles) of 3-ethoxy-2-methyl-prop-2-en-1-al, 0.42 g of anhydrous sodium acetate and 20 ml of acetic anhydride was refluxed for 10 minutes. The mixture was allowed to cool, and the dye was filtered off, washed with ethanol and ether and recrystallized from ethanol. λmax (DMF): 860 nm.

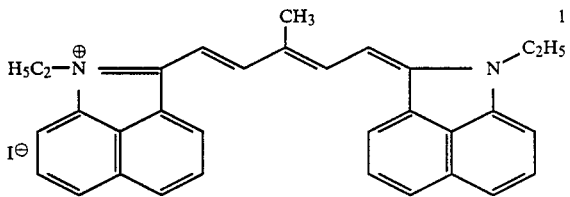

EXAMPLE 2

A mixture of 0.75 g (1.4 millimoles) of 1-ethyl-2-methyl-6,8-diphenylthiobenzo[c,d]indolium iodide and 0.08 g (0.7 millimoles) of 3-ethoxy-2-methyl-prop-2-en-1-al was refluxed for 10 minutes with 0.05 g of anhydrous sodium acetate and 6 ml of acetic anhydride. The product was filtered off and washed with ethanol and ether. λmax (DMF): 940 nm.

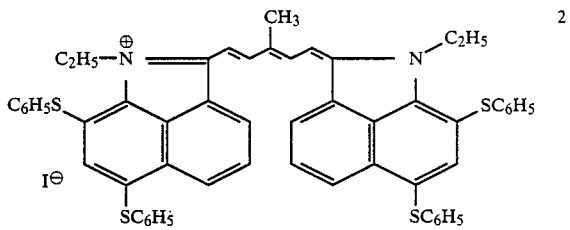

The dyes listed in the table below are obtained in a similar manner.

| Dye number | λmax (solvent) | |
|---|---|---|
| 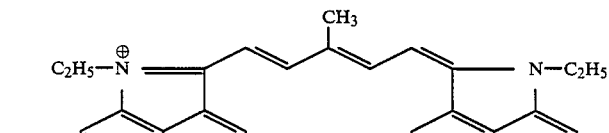 3 | (DMF) | 870 nm |
| 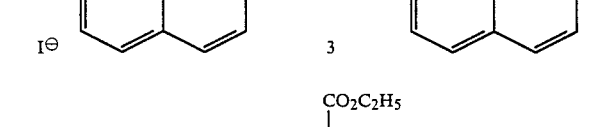 4 | (DMF) | 820 nm |

-continued
| Dye number | λmax (solvent) | |
|---|---|---|
| 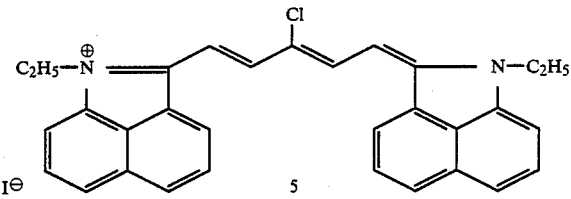 5 | (DMF) | 872 nm |
| 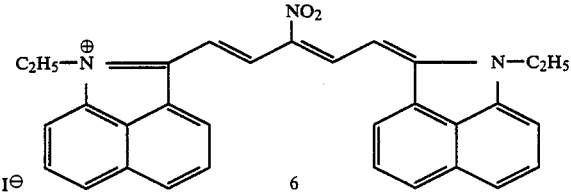 6 | (EtOH) | 840 nm |
| 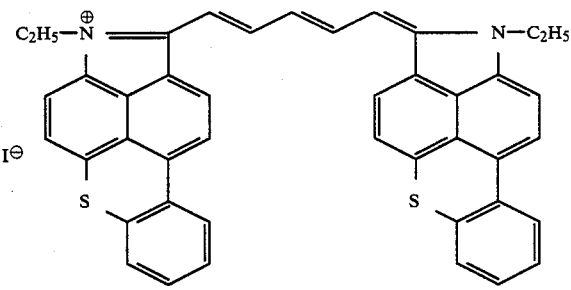 7 | (DMF) | 960 nm |
| 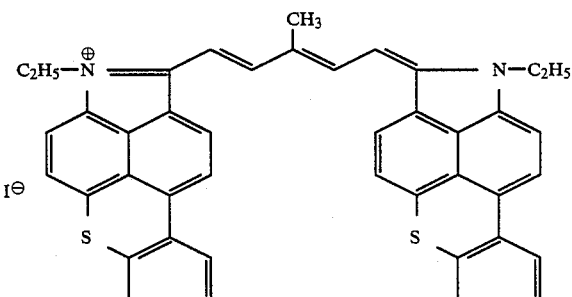 8 | (DMF) | 1065 nm |
| 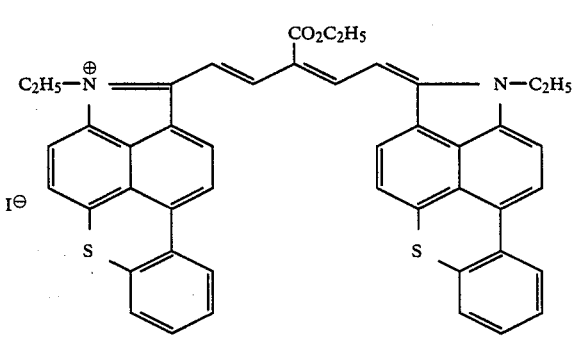 9 | (DMF) | 1000 nm |

| Dye number | λmax (solvent) |
|---|---|
| 10 | (DMF) 893 nm |
| 11 | (DMF) 840 nm |
| 12 | (THF) 930 nm |
| 13 | (DMF) 940 nm |
| 14 | (DMF) 940 nm |

-continued
| Dye number | λmax (solvent) |
|---|---|
| 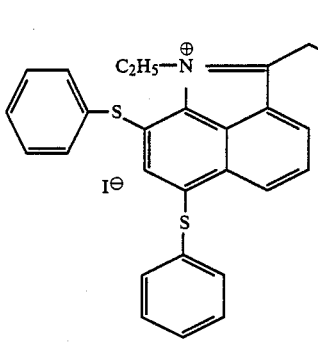 15 | (DMF) 935 nm |
| 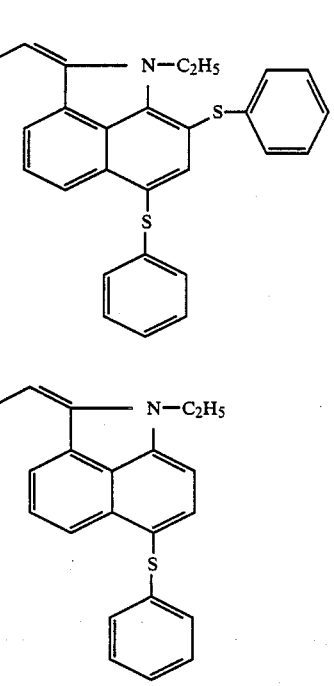 16 | (DMF) 878 nm |
| 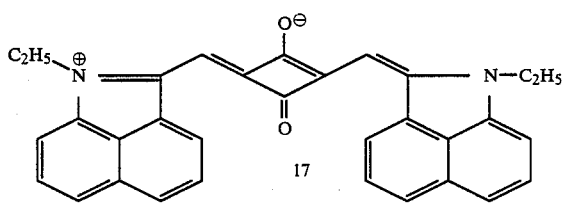 17 | (THF) 880 nm |
| 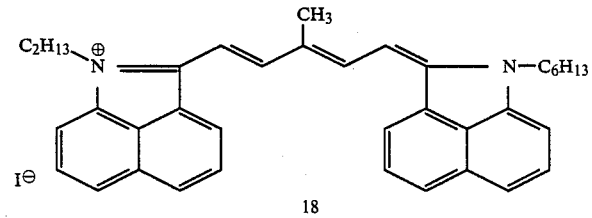 18 | (DMF) 874 nm |
| 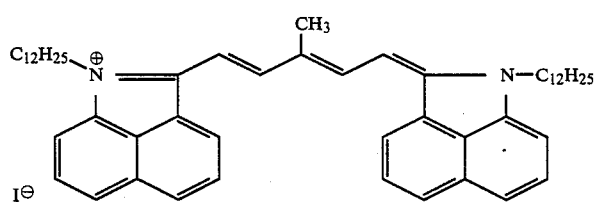 19 | (EtOH) 864 nm |
| 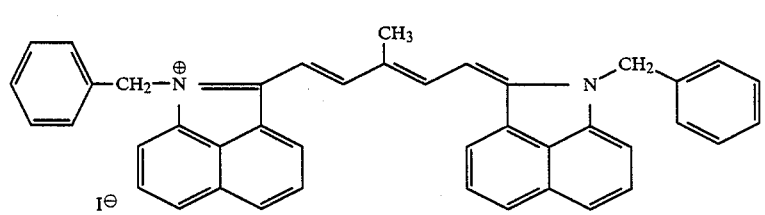 20 | (DMF) 873 nm |

-continued

| Dye number | λmax (solvent) | |
|---|---|---|
| 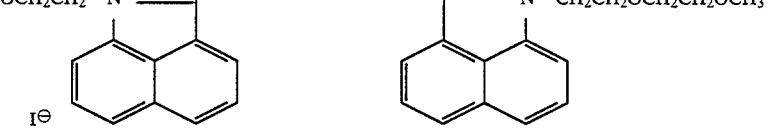 21 | (EtOH) | 867 nm |
| 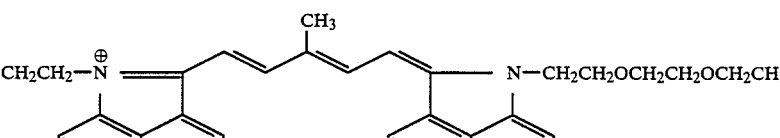 22 | (EtOH) | 867 nm |
| 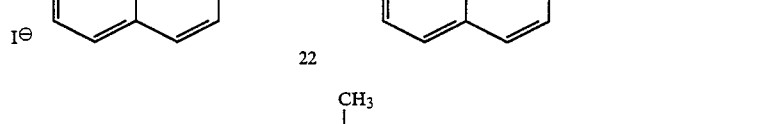 23 | (EtOH) | 868 nm |
| 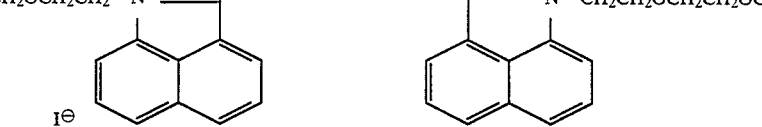 24 | (EtOH) | 864 nm |

Production of the optical recoding medium (1) Two 1.2 mm thick polycarbonate disks having a diameter of 120 mm and possessing a central hole with a diameter of 15 mm were cleaned with alcohol and coated with a 0.3 μm thick subbing layer of a photopolymer under clean-room conditions. The photopolymer was cured with UV light, after which a solution of dye number 23 and 1.3 g of a 70:30 methyl methacrylate/methacrylic acid copolymer in 200 ml of ethyl acetate was applied to the disks by the whirler-coating method at 4,800 rpm. After the layer had dried its thickness was 0.26 μm. A 0.03 μm thick aluminum mirror was applied to the dye laser in a vapor deposition apparatus under reduced pressure, and a 1.2 μm thick protective layer was applied on top of this by whirler-coating using polystyrene in xylene. The two disks were bonded together in the form of a sandwich, with the coated surfaces facing inward, by a suitable spacer ring, so that an air gap of B 0.4 mm remained. Isolated holes about 1 μm in size were written in the active layer by means of a AlGaAs laser (λ=820 nm) mounted on a rotating table. The sensitivity of the layer was better than 1 nJ/hole, and an excellent signal/noise ratio was obtained on reading the points.

(2) 0.129 g of dye number 23 and 1.29 g of a binder based on polymethyl methacrylate (10% strength by weight in butan-2-one) were dissolved in 2.43 g of butan-2-one. The solution was filtered and applied to a polymethyl methacrylate disk having a diameter of 120 mm and possessing a central hole with a diameter of 15 mm by the whirler-coating method at 1000 rpm. The resulting layer had an extinction of 0.38 at 788 nm.

Isolated holes about 1 μm in size were written in the active layer by means of a AlGaAs (λ=820 nm) mounted on a rotating table. The sensitivity of the layer was better than B 1 nJ/hole. An excellent signal/noise ratio was observed on reading the points.

(3) A recording medium was obtained using dye number 22 and a method similar to that described under 2).

We claim:

1. A naphtholactam dye of the formula Ia

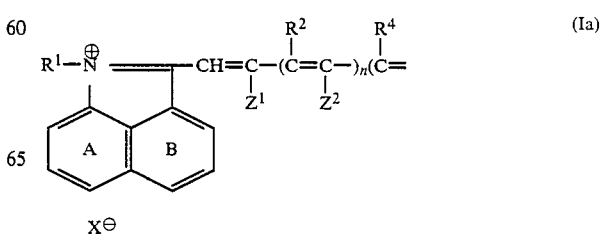

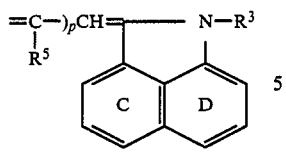

where
- $R^1$ and $R^3$ are identical or different and independently of one another are each $C_4$–$C_{20}$-alkyl which may be interrupted by ether oxygen or each are benzyl, 2-phenylethyl or $C_5$ or $C_6$-cycloalkyl
- $R^2$, $R^4$ and $R^5$ are identical or different and independently of one another are each hydrogen, $C_1$–$C_4$-alkyl, $C_5$–$C_6$-cycloalkyl, phenyl, alkoxycarbonyl in which alkoxy is $C_1$–$C_4$,-carboxyalkyl in which alkyl is methyl or ethyl, hydroxyl, chlorine or bromine,
- n is 0 or 1,
- p, independently of n, is 0, 1 or 2,
- $Z^1$ and $Z^2$ are each hydrogen or, where n is 1, may together form an unsubstituted or $C_1$–$C_4$-alkyl-substituted $C_2$- or $C_3$-alkylene chain or together with the moiety to which they are attached from the radical

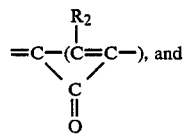

- $X^\ominus$ is an anion, and
- the rings A, B, C and D are unsubstituted or substituted by methyl, ethyl, phenyl, $C_1$–$C_4$-alkoxy, $C_1$–$C_6$-alkylthio, cyano, dialkylamino in which each alkyl is methyl or ethyl, chlorine, bromine, hydroxysulfonyl, phenylthio or the radical,

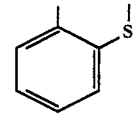

with the proviso that if
(a) at least one of the rings A, B, C or D are unsubstituted or substituted by chlorine, bromine, $C_1$–$C_4$-alkoxy, dialkylamino in which each alkyl is methyl or ethyl, n and p are not simultaneously 0,
(b) at least one of the rings A, B, C or D are unsubstituted or substituted by chlorine, bromine, $C_1$–$C_4$-alkoxy, dialkylamino in which each alkyl is methyl or ethyl, n is 1, p is 0 and $Z^1$ and $Z^2$ are each hydrogen, $R^2$ is not hydrogen,
(c) at least one of the rings A, B, C or D are unsubstituted or substituted by chlorine, bromine, $C_1$–$C_4$-alkoxy, dialkylamino in which each alkyl is methyl or ethyl, n is 0 and p is 1 or 2, $R^4$ and $R^5$ are not simultaneously hydrogen, and
(d) at least one of the rings A, B, C or D are unsubstituted or substituted by chlorine, bromine, $C_1$–$C_4$-alkoxy, dialkylamino in which each alkyl is methyl or ethyl, n and p are each 1 and $Z^1$ and $Z^2$ are each hydrogen, one or more of the radicals $R^2$, $R^4$ and $R^5$ is not hydrogen.

2. A naphtholactam dye of the formula Ia as claimed in claim 1, wherein n is 1, p is 0 or 1 and $Z^1$ and $Z^2$ together form a 1,2-ethylene or 1,3-propylene chain.

3. A naphtholactam dye of the formula Ia as claimed in claim 1 wherein n is 1 p is 0 or 1 and $Z^1$ and $Z^2$ are each hydrogen.

* * * * *

UNITED STATES PATENT AND TRADEMARK OFFICE
CERTIFICATE OF CORRECTION

PATENT NO. : 4,876,356

DATED : October 24, 1989

INVENTOR(S) : Matthias Dust, et al

It is certified that error appears in the above-identified patent and that said Letters Patent is hereby corrected as shown below:

In the Title: "Days" should be replaced by --Dyes--

Signed and Sealed this

First Day of January, 1991

Attest:

HARRY F. MANBECK, JR.

Attesting Officer

Commissioner of Patents and Trademarks